United States Patent
Kuwayama et al.

(10) Patent No.: US 9,429,066 B2
(45) Date of Patent: Aug. 30, 2016

(54) SUBCHAMBER TYPE COMBUSTION CHAMBER FOR DIESEL ENGINE

(71) Applicant: KUBOTA Corporation, Osaka-shi, Osaka (JP)

(72) Inventors: Hiroki Kuwayama, Sakai (JP); Takahiro Yamazaki, Sakai (JP); Yutaka Ishigaki, Sakai (JP); Hideyuki Koyama, Sakai (JP); Manabu Miyazaki, Sakai (JP); Katsunori Ikemachi, Sakai (JP); Yoshinori Tanaka, Sakai (JP)

(73) Assignee: KUBOTA Corporation, Osaka-Shi, Osaka (JP)

( * ) Notice: Subject to any disclaimer, the term of this patent is extended or adjusted under 35 U.S.C. 154(b) by 293 days.

(21) Appl. No.: 13/954,392

(22) Filed: Jul. 30, 2013

(65) Prior Publication Data
US 2015/0034043 A1    Feb. 5, 2015

(51) Int. Cl.
| | | |
|---|---|---|
| *F02B 19/14* | (2006.01) | |
| *F02B 19/18* | (2006.01) | |
| *F02B 19/12* | (2006.01) | |

(Continued)

(52) U.S. Cl.
CPC .............. *F02B 19/12* (2013.01); *F02B 17/005* (2013.01); *F02B 19/10* (2013.01); *F02B 19/1009* (2013.01); *F02B 19/14* (2013.01); *F02B 19/18* (2013.01); *Y02T 10/125* (2013.01)

(58) Field of Classification Search
CPC ........ F02B 19/12; F02B 19/14; F02B 19/18; F02B 19/10; F02B 19/1009; F02B 19/1019; F02B 17/005

USPC ................................. 123/275, 260, 263, 293
See application file for complete search history.

(56) References Cited

U.S. PATENT DOCUMENTS 4,323,039 A * 4/1982 Tsugekawa et al. .......... 123/275
4,395,983 A * 8/1983 Hamai et al. .................. 123/263

(Continued)

FOREIGN PATENT DOCUMENTS

JP    10009572 A  *  1/1998
JP    2001-248444 A    9/2001

(Continued)

OTHER PUBLICATIONS

Office Action issued Nov. 18, 2014 in JP Application No. 2012-037071.

*Primary Examiner* — Mahmoud Gimie
(74) *Attorney, Agent, or Firm* — Panitch Schwarze Belisario & Nadel

(57) ABSTRACT

A subchamber type combustion chamber for a diesel engine, which reduces fuel consumption rate and combustion noise. To achieve the object, a subchamber type combustion chamber is communicated with a main combustion chamber through a nozzle hole, a fuel injection nozzle faces into the subchamber, and a glow plug extends into the subchamber. A heat generating portion of the glow plug includes a rod-shaped portion and a projecting portion projecting from an end of the rod-shaped portion. The projecting portion is provided with a convex curved surface projecting from a circular peripheral edge at the end of the rod-shaped portion while the convex curved surface is reduced in diameter. The percentage of value P/D obtained by dividing projection dimension P of the projecting portion from the end of the rod-shaped portion by diameter dimension D at the end of the rod-shaped portion is 3% to 23%.

9 Claims, 3 Drawing Sheets

(51) Int. Cl.
*F02B 17/00* (2006.01)
*F02B 19/10* (2006.01)

(56) References Cited

U.S. PATENT DOCUMENTS

| | | | |
|---|---|---|---|
| 4,406,260 A * | 9/1983 | Burley | 123/258 |
| 4,545,344 A * | 10/1985 | Matuo | 123/286 |
| 4,676,209 A * | 6/1987 | Etoh et al. | 123/293 |
| 4,875,939 A * | 10/1989 | Miyakawa et al. | 123/271 |
| 4,899,707 A * | 2/1990 | Matsuura et al. | 123/270 |
| 4,926,817 A * | 5/1990 | Imoto et al. | 123/292 |
| 5,050,550 A * | 9/1991 | Gao | 123/275 |
| 5,769,050 A * | 6/1998 | Ito et al. | 123/257 |
| 2008/0095943 A1 * | 4/2008 | May et al. | 427/376.1 |

FOREIGN PATENT DOCUMENTS

| | | | | |
|---|---|---|---|---|
| JP | 2002-180835 A | 6/2002 | | |
| JP | DE 10306264 A1 * | 9/2003 | | F23Q 7/001 |
| JP | 2008-235034 A | 10/2008 | | |
| JP | 2011-069550 A | 4/2011 | | |

* cited by examiner

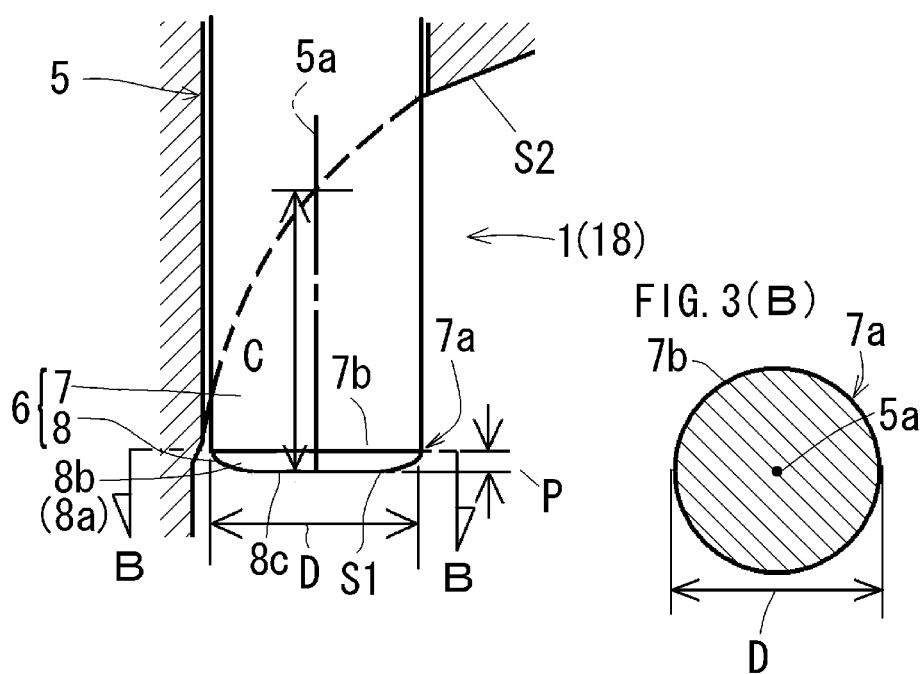

SUBCHAMBER TYPE COMBUSTION CHAMBER FOR DIESEL ENGINE

BACKGROUND OF THE INVENTION (1) Field of the Invention

The present invention relates to a subchamber type combustion chamber for a diesel engine. More specifically, the present invention relates to a subchamber type combustion chamber for a diesel engine, which can reduce fuel consumption rate and combustion noise.

(2) Description of Related Art

Conventionally, in a subchamber type combustion chamber for a diesel engine, a subchamber is communicated with a main combustion chamber through a nozzle hole, a fuel injection nozzle faces into the subchamber, and a glow plug extends into the subchamber (for instance, see Japanese Patent Application Laid-Open (JP-A) No. 2001-248444 (see FIG. 1)).

According to such a subchamber type combustion chamber, a fuel is injected from the fuel injection nozzle to compressed air pushed from the main combustion chamber through the nozzle hole in a compression stroke to cause premixed combustion in the subchamber. By the combustion pressure, an uncombusted gas is injected from the subchamber through the nozzle hole into the main combustion chamber and is then mixed with the compressed air in the main combustion chamber to be combusted in the main combustion chamber. The increase speed of the combustion pressure in the main combustion chamber can be lowered to reduce combustion noise.

In such a subchamber type combustion chamber, a heat generating portion of the glow plug includes a rod-shaped portion and a projecting portion projecting from the rod-shaped portion. The projecting portion typically has a semispherical surface. The percentage of value (P/D) obtained by dividing projection dimension (P) of the projecting portion from an end of the rod-shaped portion by diameter dimension (D) at the end of the rod-shaped portion is approximately 50%.

<<Problems>>Fuel consumption rate and combustion noise are high.

When the percentage of value (P/D) obtained by dividing projection dimension (P) of the projecting portion from the end of the rod-shaped portion by diameter dimension (D) at the end of the rod-shaped portion is approximately 50%, fuel consumption rate and combustion noise are high.

This reason is assumed as follows.

That is, the surface area of the projecting portion becomes too large, so that a large amount of combustion heat escapes from the subchamber through the projecting portion during engine operation, resulting in great heat loss. Consequently, fuel consumption rate is high. In addition, abrupt premixed combustion due to delayed ignition occurs, resulting in high combustion noise.

BRIEF SUMMARY OF THE INVENTION

An object of the present invention is to provide a subchamber type combustion chamber for a diesel engine, which can reduce fuel consumption rate and combustion noise.

As shown in FIG. 2, there is provided a subchamber type combustion chamber for a diesel engine in which a subchamber (1) is communicated with a main combustion chamber (2) through a nozzle hole (3), a fuel injection nozzle (4) faces into the subchamber (1), and a glow plug (5) extends into the subchamber (1), wherein as illustrated in FIGS. 1A and 1B or FIGS. 3A and 3B, a heat generating portion (6) of the glow plug (5) includes a rod-shaped portion (7) and a projecting portion (8) projecting from an end (7a) of the rod-shaped portion (7), the projecting portion (8) being provided with a convex curved surface (8a) projecting from a circular peripheral edge (7b) at the end (7a) of the rod-shaped portion (7) while the convex curved surface (8a) is reduced in diameter, wherein the percentage of value P/D obtained by dividing projection dimension P of the projecting portion (8) from the end (7a) of the rod-shaped portion (7) by diameter dimension D at the end (7a) of the rod-shaped portion (7) is 3% to 23%.

<<Effect 1-1>>Fuel consumption rate and combustion noise can be reduced.

As illustrated in FIGS. 1A and 1B or FIGS. 3A and 3B, the percentage of value (P/D) obtained by dividing projection dimension (P) of the projecting portion (8) from the end (7a) of the rod-shaped portion (7) by diameter dimension (D) at the end (7a) of the rod-shaped portion (7) is 23% or less. Therefore, the projecting portion (8) can have an ideal surface area to reduce fuel consumption rate and combustion noise.

When the percentage is more than the upper limit value in the proper range, the surface area of the projecting portion (8) becomes too large. A large amount of combustion heat escapes from the subchamber (1) through the projecting portion (8) during engine operation, resulting in great heat loss. Consequently, fuel consumption rate and combustion noise become high.

<<Effect 1-2>>Cold starting performance can be maintained high.

As illustrated in FIGS. 1A and 1B or FIGS. 3A and 3B, the percentage of value (P/D) obtained by dividing projection dimension (P) of the projecting portion (8) from the end (7a) of the rod-shaped portion (7) by diameter dimension (D) at the end (7a) of the rod-shaped portion (7) is 3% or more. Therefore, the projecting portion (8) can have an ideal surface area to maintain cold starting performance high.

When the percentage is less than the lower limit value in the proper range, the surface area of the projecting portion (8) becomes too small. The heat release amount from the heat generating portion (6) of the glow plug (5) is not enough at the time of cold starting to make the preheat in the subchamber (1) insufficient. Consequently, cold starting performance is lowered.

<<Effect 2-1>>Fuel consumption rate and combustion noise can be reduced.

The percentage of value (S1/S2) obtained by dividing surface area (S1) of the projecting portion (8) of the glow plug (5) by surface area (S2) of the subchamber is 1.28% or less. Therefore, fuel consumption rate and combustion noise can be reduced.

When the percentage is more than the upper limit value in the optimum range, the influence of the surface area of the projecting portion (8) of the glow plug (5) on the subchamber (1) becomes too great. Combustion heat is likely to escape from the subchamber (1) through the projecting portion (8) during engine operation. Consequently, the function of reducing fuel consumption rate and combustion noise can be weak.

<<Effect 2-2>>Cold starting performance can be maintained high.

The percentage of value (S1/S2) regarding surface area (S1) of the projecting portion (8) of the glow plug (5) is 0.66% or more. Therefore, cold starting performance can be maintained high.

When the percentage is less than the lower limit value in the optimum range, the influence of the surface area of the projecting portion (8) of the glow plug (5) on the subchamber (1) becomes too little. The heat release from the glow plug (5) is limited at the time of cold starting.

Consequently, the function of maintaining cold starting performance high can be weak.

<<Effect 3-1>>Fuel consumption rate and combustion noise can be reduced.

As illustrated in FIGS. 1A and 1B or FIGS. 3A and 3B, the percentage of value (C/D) regarding extension dimension (C) of the glow plug (5) into the subchamber (1) is 150% or less. Therefore, fuel consumption rate and combustion noise can be reduced.

When the percentage is more than the upper limit value in the optimum range, the influence of the surface area of the heat generating portion (6) of the glow plug (5) on the subchamber (1) becomes too great. Combustion heat is likely to escape from the subchamber (1) through the heat generating portion (6) during engine operation. Consequently, the function of reducing fuel consumption rate and combustion noise can be weak.

<<Effect 3-2>>Cold starting performance can be maintained high.

As illustrated in FIGS. 1A and 1B or FIGS. 3A and 3B, the percentage of value (C/D) regarding extension dimension (C) of the heat generating portion (6) of the glow plug (5) into the subchamber (1) is 115% or more. Therefore, cold starting performance can be maintained high.

When the percentage is less than the lower limit value in the optimum range, the influence of the surface area of the heat generating portion (6) of the glow plug (5) on the subchamber (1) becomes too little. The heat release from the heat generating portion (6) of the glow plug (5) is limited at the time of cold starting. Consequently, the function of maintaining cold starting performance high can be weak.

<<Effect 4-1>>Fuel consumption rate and combustion noise can be reduced.

The compression ratio of the combustion chamber is 22.5 to 25.0. Therefore, fuel consumption rate and combustion noise can be reduced.

When the compression ratio is less than the lower limit value in the optimum range, the compression temperature becomes too low to lower the combustion efficiency. Consequently, the function of reducing fuel consumption rate can be weak.

When the compression ratio is more than the upper limit value in the optimum range, the compression temperature becomes too high so that abrupt premixed combustion is likely to occur. Consequently, the function of reducing combustion noise can be weak.

<<Effect 4-2>>Cold starting performance can be maintained high.

The compression ratio of the combustion chamber is 22.5 or more. Therefore, cold starting performance can be maintained high.

When the compression ratio is less than the lower limit value in the optimum range, the compression temperature becomes too low. Consequently, the function of enhancing cold starting performance can be weak.

<<Effect 5-1>>Fuel consumption rate and combustion noise can be reduced.

As illustrated in FIG. 1A or FIG. 3A, the entire projecting portion (8) of the glow plug (5) provides the convex curved surface (8a). The compressed air (9) flows along the smooth convex curved surface (8a), so that turbulence of the compressed air (9) due to the projecting portion (8) is unlikely to occur. The mixing of the compressed air (9) and the injected fuel is made uniform, thereby realizing good and gentle combustion. Therefore, fuel consumption rate and combustion noise can be reduced.

<<Effect 5-2>>Cold starting performance can be maintained high.

The mixing of the compressed air (9) and the injected fuel is made uniform, thereby realizing good combustion. Therefore, cold starting performance can be maintained high.

<<Effect 6-1>>Fuel consumption rate and combustion noise can be reduced.

As illustrated in FIG. 3A, in the projecting portion (8) of the glow plug (5), the adjacent portion (8b) to the rod-shaped portion (7) provides the convex curved surface (8a), and the end (8c) is a flat surface. The compressed air (9) flows along the smooth convex curved surface (8a), so that turbulence of the compressed air (9) due to the projecting portion (8) is unlikely to occur. The mixing of the compressed air (9) and the injected fuel is made uniform, thereby realizing good and gentle combustion. Therefore, fuel consumption rate and combustion noise can be reduced.

<<Effect 6-2>>Cold starting performance can be maintained high.

The mixing of the compressed air (9) and the injected fuel is made uniform, thereby realizing good combustion. Therefore, cold starting performance can be maintained high.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIGS. 1A and 1B are diagrams of assistance in explaining a subchamber type combustion chamber for a diesel engine according to a first embodiment of the present invention, in which FIG. 1A is an enlarged view of a glow plug and the periphery thereof, and FIG. 1B is a cross-sectional view taken along line B-B of FIG. 1A;

FIGS. 3A and 3B are diagrams of assistance in explaining a subchamber type combustion chamber for a diesel engine according to a second embodiment of the present invention, in which FIG. 3A is an enlarged view of a glow plug and the periphery thereof, and FIG. 3B is a cross-sectional view taken along line B-B of FIG. 3A.

DETAILED DESCRIPTION OF THE INVENTION

Figure 1:
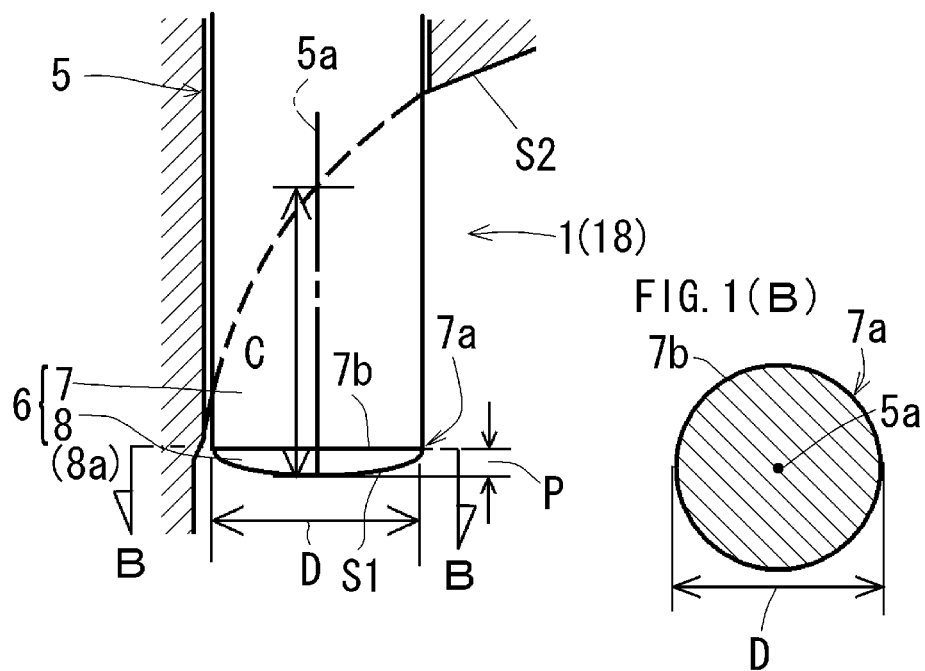
Figure 2:
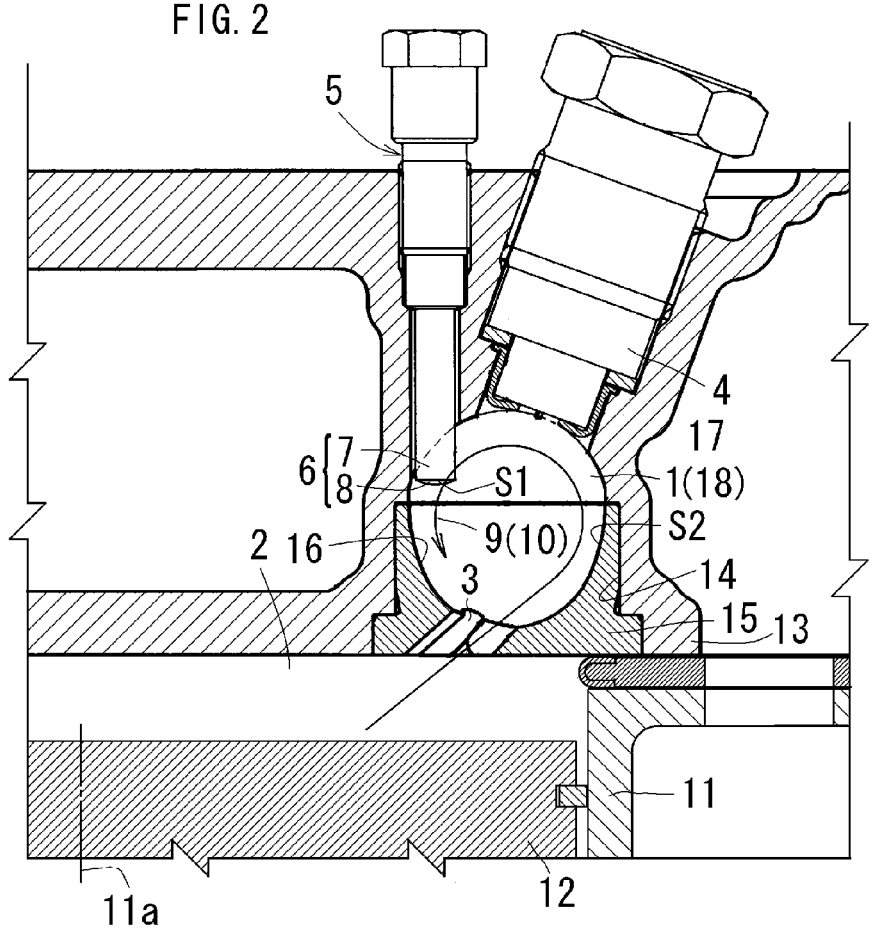
FIG. 2 is a longitudinal sectional view of the subchamber type combustion chamber for a diesel engine according to the first embodiment of the present invention.

FIGS. 1A, 1B, and 2 are diagrams of assistance in explaining a subchamber type combustion chamber for a diesel engine according to a first embodiment of the present invention, and FIGS. 3A and 3B are diagrams of assistance in explaining a subchamber type combustion chamber for a diesel engine according to a second embodiment of the present invention. In the embodiments, a water-cooled vertical inline multi-cylinder diesel engine will be described.

First, an engine according to the first embodiment will be described.

The engine is a water-cooled vertical inline multi-cylinder diesel engine, and includes a subchamber type combustion chamber.

As shown in FIG. 2, the engine includes a piston (12) fitted in a cylinder (11) and raised and lowered, a cylinder head (13) assembled to the upper portion of the cylinder (11), and a main combustion chamber (2) formed between the cylinder head (13) and the piston (12). A semispherical recess (14) recessed upward is formed in the cylinder head (13). A mouthpiece (15) is fitted in the recess (14). A parabolic recess (16) recessed downward is formed in the mouthpiece (15). A back portion (17) of the recess (14) in the cylinder head (13) and the recess (16) in the mouthpiece (15) form an oval (substantially spherical) subchamber (1). A nozzle hole (3) is provided in the mouthpiece (15). The nozzle hole (3) is directed in the tangent line direction of the inner peripheral surface of the subchamber (1) so that the subchamber (1) provides a vortex chamber (18). A compressed air (9) pushed from the nozzle hole (3) into the vortex chamber (18) in a compression stroke provides a vortex flow (10).

For the subchamber (1), in place of the vortex chamber (18), a pre-combustion chamber can be used.

The configuration of the subchamber type combustion chamber is as follows.

As shown in FIG. 2, the subchamber (1) is communicated with the main combustion chamber (2) through the nozzle hole (3), a fuel injection nozzle (4) faces into the subchamber (1), and a glow plug (5) extends into the subchamber (1).

As shown in FIGS. 1A and 1B, a heat generating portion (6) of the glow plug (5) includes a rod-shaped portion (7), and a projecting portion (8) projecting from an end (7a) of the rod-shaped portion (7). The projecting portion (8) is provided with a convex curved surface (8a) projecting from a circular peripheral edge (7b) at the end (7a) of the rod-shaped portion (7) while the convex curved surface (8a) is reduced in diameter.

The percentage of value (P/D) obtained by dividing projection dimension (P) of the projecting portion (8) from the end (7a) of the rod-shaped portion (7) by diameter dimension (D) at the end (7a) of the rod-shaped portion (7) is 3% to 23%. The value range is the proper range of the percentage of value (P/D) regarding projection dimension (P) of the projecting portion (8) from the end (7a) of the rod-shaped portion (7). The optimum range of the percentage of value (P/D) is 5% to 20%.

The percentage of value (S1/S2) obtained by dividing surface area (S1) of the projecting portion (8) of the glow plug (5) by surface area (S2) of the subchamber (1) is 0.66% to 1.28%. The value range is the optimum range of the percentage of value (S1/S2) regarding surface area (S1) of the projecting portion (8) of the glow plug (5).

As shown in FIGS. 1A and 1B, the percentage of value (C/D) obtained by dividing extension dimension (C) of the heat generating portion (6) of the glow plug (5) into the subchamber (1) by diameter dimension (D) at the end (7a) of the rod-shaped portion (7) is 115% to 150%. The value range is the optimum range of the percentage of value (C/D) regarding extension dimension (C) of the glow plug (5) into the subchamber (1). Extension dimension (C) of the heat generating portion (6) of the glow plug (5) into the subchamber (1) is a dimension measured at the position of a center axis (5a) of the glow plug (5). The heat generating portion (6) of the glow plug (5) is located on the downstream side in the rotating direction of the vortex flow (10) in the fuel injection nozzle (4), and extends from the upper portion of the vortex chamber (18) into the vortex chamber (18) in the direction parallel to a cylinder center axis (11a). The end of the rod-shaped portion (7) is along the inner peripheral surface of the vortex chamber (18).

The compression ratio of the combustion chamber is 22.5 to 25.0. The value range is the optimum range of the compression ratio of the combustion chamber.

As shown in FIG. 1A, the entire projecting portion (8) of the glow plug (5) provides the convex curved surface (8a). The convex curved surface (8a) is a partially spherical surface. The convex curved surface (8a) is not limited to the partially spherical surface, and may be other convex curved surfaces, such as a parabolic surface.

As compared with comparative example engines using the values outside the proper and optimum ranges, all example engines using the values in the proper and optimum ranges according to the first embodiment obtained later-described effective experiment results for fuel consumption rate, combustion noise, and cold starting performance.

In the experiments, a water-cooled vertical inline two-cylinder engine including a vortex chamber type combustion chamber was used. The displacement of the engine was 479 cc, the volume of the vortex chamber (18) was 8.2 cc, and the volume of the main combustion chamber (2) at the upper dead center of the piston (12) was 2.1 cc.

Made were a minimum value example engine using each minimum value in the proper or optimum range, a maximum value example engine using each maximum value in the proper or optimum range, and an intermediate value example engine using each intermediate value in the proper or optimum range.

In the minimum value example engine, the percentage of value (P/D) regarding projection dimension (P) of the projecting portion (8) was 3%, the percentage of value (S1/S2) regarding surface area (S1) of the projecting portion (8) was 0.66%, the percentage of value (C/D) regarding extension dimension (C) of the heat generating portion (6) of the glow plug (5) was 115%, and the compression ratio of the combustion chamber was 22.5.

In the maximum value example engine, the percentage of value (P/D) regarding projection dimension (P) of the projecting portion (8) was 23%, the percentage of value (S1/S2) regarding surface area (S1) of the projecting portion (8) was 1.28%, the percentage of value (C/D) regarding extension dimension (C) of the heat generating portion (6) of the glow plug (5) into the subchamber (1) was 150%, and the compression ratio of the combustion chamber was 25.0.

In the intermediate value example engine, the percentage of value (P/D) regarding projection dimension (P) of the projecting portion (8) was 13%, the percentage of value (S1/S2) regarding surface area (S1) of the projecting portion (8) was 0.97%, the percentage of value (C/D) regarding extension dimension (C) of the heat generating portion (6) of the glow plug (5) was 133%, and the compression ratio of the combustion chamber was 23.8.

In the fuel consumption rate and combustion noise experiments, each engine was operated at an engine rotational speed of 3600 rpm and a 100% load factor. The 100% load factor was the rated load at the rated rotational speed obtaining the highest output.

In the cold starting performance experiment, the engine ambient temperature was −5° C. before engine operation to pre-heat the vortex chamber (18) by the glow plug (5) for engine cranking by a starter motor.

An experiment evaluating the proper range of the percentage of value (P/D) regarding projection dimension (P) of the projecting portion (8) was conducted.

In each comparative example engine with respect to each example engine, only the percentage of value (P/D) was changed to 25% which was more than the upper limit value of 23% in the proper range.

Comparisons of fuel consumption rate and combustion noise were made between each comparative example engine and each example engine.

As compared with each comparative example engine, each example engine reduced fuel consumption rate by approximately 2% and combustion noise.

The reduction in fuel consumption rate was evaluated based on fuel consumption rate after each engine was operated for 20 hours. The reduction in combustion noise was evaluated by hearing engine noise caused during engine operation. The reduction in fuel consumption rate and the reduction in combustion noise were evaluated in the same manner in the following experiments.

In each comparative example engine with respect to each example engine, only the percentage of value (P/D) was changed to 2.5% which was less than the lower limit value of 3% in the proper range.

A comparison of cold starting performance was made between each comparative example engine and each example engine. As compared with each comparative example engine, each example engine enhanced cold starting performance.

Cold starting performance was evaluated according to required starting time during which the engine ambient temperature was −5° C. before engine operation to pre-heat the vortex chamber (18) by the glow plug (5) for 10 seconds for starting engine cranking by a starter motor so that the engine rotational speed reached the complete explosion rotational speed. Cold starting performance was evaluated in the same manner in the following experiments.

An experiment evaluating the optimum range of the percentage of value (P/D) regarding projection dimension (P) of the projecting portion (8) was conducted.

In an optimum minimum value example engine, only the percentage of value (P/D) of the minimum value example engine was changed to the lower limit value of 5% in the optimum range. In an optimum maximum value example engine, only the percentage of value (P/D) of the maximum value example engine was changed to the upper limit value of 20% in the optimum range.

A comparison of cold starting performance was made between the minimum value example engine and the optimum minimum value example engine. As compared with the minimum value example engine, the optimum minimum value example engine enhanced cold starting performance.

Comparisons of fuel consumption rate and combustion noise were made between the maximum value example engine and the optimum maximum value example engine. As compared with the maximum value example engine, the optimum maximum value example engine reduced fuel consumption rate and combustion noise.

An experiment evaluating the optimum range of the percentage of value (S1/S2) regarding surface area (S1) of the projecting portion (8) was conducted.

In each comparative example engine with respect to each example engine, only the percentage of value (S1/S2) was changed to 1.40% which was more than the upper limit value of 1.28% in the optimum range.

Comparisons of fuel consumption rate and combustion noise were made between each comparative example engine and each example engine.

As compared with each comparative example engine, each example engine reduced fuel consumption rate by approximately 2% and combustion noise.

In each comparative example engine with respect to each example engine, only the percentage of value (S1/S2) was changed to 0.60% which was less than the lower limit value of 0.66% in the optimum range.

A comparison of cold starting performance was made between each comparative example engine and each example engine. As compared with each comparative example engine, each example engine enhanced cold starting performance.

An experiment evaluating the optimum range of the percentage of value (C/D) regarding extension dimension (C) of the glow plug (5) was conducted.

In each comparative example engine with respect to each example engine, only the percentage of value (C/D) was changed to 165% which was more than the upper limit value of 150% in the optimum range.

Comparisons of fuel consumption rate and combustion noise were made between each comparative example engine and each example engine.

As compared with each comparative example engine, each example engine reduced fuel consumption rate by approximately 2% and combustion noise.

In each comparative example engine with respect to each example engine, only the percentage of value (C/D) was changed to 105% which was less than the lower limit value of 115% in the optimum range.

A comparison of cold starting performance was made between each comparative example engine and each example engine. As compared with each comparative example engine, each example engine enhanced cold starting performance.

An experiment evaluating the optimum range of the compression ratio of the combustion chamber was conducted.

In each comparative example engine with respect to each example engine, only the compression ratio of the combustion chamber of the engine was changed to 20.0 which was less than the lower limit value of 22.0 in the optimum range.

Comparisons of fuel consumption rate and cold starting performance were made between each comparative example engine and each example engine. As compared with each comparative example engine, each example engine reduced fuel consumption rate by approximately 2% and enhanced cold starting performance.

In each comparative example engine with respect to each example engine, only the compression ratio of the combustion chamber was changed to 27.5 which was more than the upper limit value of 25.0 in the optimum range.

A comparison of combustion noise was made between each comparative example engine and each example engine. As compared with each comparative example engine, each example engine reduced consumption noise.

An experiment evaluating the shape of the projecting portion (8) of the glow plug (5) was conducted.

In each comparative example engine with respect to each example engine, only the shape of the projecting portion (8) of the glow plug (5) was changed to a conical shape.

Comparisons of fuel consumption rate, combustion noise, and cold starting performance were made between each comparative example engine and each example engine. As compared with each comparative example engine, each example engine reduced fuel consumption rate and combustion noise and enhanced cold starting performance.

An engine according to a second embodiment will be described.

As shown in FIG. 3A, the engine according to the second embodiment is different from the first embodiment only in that in the projecting portion (8) of the glow plug (5), an adjacent portion (8b) to the rod-shaped portion (7) provides the convex curved surface (8a), and an end (8c) has a flat surface. Other configurations and the proper and optimum value ranges are the same as the first embodiment. In FIGS. 3A and 3B, the same elements as the first embodiment are indicated by the same reference numerals. Note that the convex curved surface (8a) is a partially spherical surface. The convex curved surface (8a) is not limited to the partially spherical surface, and may be other convex curved surfaces, such as a parabolic surface.

The same experiments as the first embodiment were conducted for the second embodiment. The same experiment results as the first embodiment were obtained. In the experiment which evaluated the shape of the projecting portion (8) of the glow plug (5), in each comparative example engine with respect to each example engine, only the shape of the projecting portion (8) of the glow plug (5) was changed to a circular truncated cone shape.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A subchamber type combustion chamber for a diesel engine in which a subchamber is communicated with a main combustion chamber through a nozzle hole, a fuel injection nozzle faces into the subchamber, and a glow plug extends into the subchamber, wherein a heat generating portion of the glow plug includes a rod-shaped portion having an end defining a circular peripheral edge and a projecting portion projecting from the end of the rod-shaped portion, the projecting portion having a convex curved surface projecting from the circular peripheral edge of the end of the rod-shaped portion and reducing in diameter therefrom, wherein the percentage of value P/D obtained by dividing projection dimension P of the projecting portion from the end of the rod-shaped portion by diameter dimension D at the end of the rod-shaped portion is 3% to 23%, and wherein the percentage of value S1/S2 obtained by dividing surface area S1 of the projecting portion of the glow plug by surface area S2 of the subchamber is 0.66% to 1.28%.

2. The subchamber type combustion chamber for a diesel engine according to claim 1, wherein the percentage of value C/D obtained by dividing extension dimension C of the heat generating portion of the glow plug into the subchamber by diameter dimension D at the end of the rod-shaped portion is 115% to 150%.

3. The subchamber type combustion chamber for a diesel engine according to claim 2, wherein a compression ratio of the combustion chamber is 22.5 to 25.0.

4. The subchamber type combustion chamber for a diesel engine according to claim 3, wherein the entire projecting portion of the glow plug provides the convex curved surface.

5. The subchamber type combustion chamber for a diesel engine according to claim 3, wherein in the projecting portion of the glow plug, an adjacent portion to the rod-shaped portion provides the convex curved surface, and an end has a flat surface.

6. The subchamber type combustion chamber for a diesel engine according to claim 1, wherein a compression ratio of the combustion chamber is 22.5 to 25.0.

7. The subchamber type combustion chamber for a diesel engine according to claim 6, wherein the entire projecting portion of the glow plug provides the convex curved surface.

8. The subchamber type combustion chamber for a diesel engine according to claim 6, wherein in the projecting portion of the glow plug, an adjacent portion to the rod-shaped portion provides the convex curved surface, and an end has a flat surface.

9. The subchamber type combustion chamber for a diesel engine according to claim 1, wherein in the projecting portion of the glow plug, an adjacent portion to the rod-shaped portion provides the convex curved surface, and an end has a flat surface.

* * * * *